(12) United States Patent
Ueno

(10) Patent No.: US 9,580,051 B2
(45) Date of Patent: Feb. 28, 2017

(54) CONTROL DEVICE AND CONTROL METHOD FOR VEHICLE

(75) Inventor: Koki Ueno, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 1036 days.

(21) Appl. No.: 13/003,528

(22) PCT Filed: Jun. 18, 2009

(86) PCT No.: PCT/JP2009/061073
§ 371 (c)(1),
(2), (4) Date: Jan. 10, 2011

(87) PCT Pub. No.: WO2010/004839
PCT Pub. Date: Jan. 14, 2010

(65) Prior Publication Data
US 2011/0112732 A1    May 12, 2011

(30) Foreign Application Priority Data

Jul. 11, 2008    (JP) .................. 2008-181384

(51) Int. Cl.
| | |
|---|---|
| B60T 1/00 | (2006.01) |
| B60R 25/06 | (2006.01) |
| F16H 61/32 | (2006.01) |
| F16H 63/48 | (2006.01) |
| F16H 61/28 | (2006.01) |

(52) U.S. Cl.
CPC .............. *B60T 1/005* (2013.01); *B60R 25/06* (2013.01); *F16H 61/32* (2013.01); *F16H 63/483* (2013.01); *F16H 2061/283* (2013.01); *F16H 2061/326* (2013.01)

(58) Field of Classification Search
CPC ........ B60R 25/06; B60T 1/005; F16H 63/483
USPC ............................................. 701/51
See application file for complete search history.

(56) References Cited

U.S. PATENT DOCUMENTS

| | | | |
|---|---|---|---|
| 4,621,328 A | 11/1986 | Arai et al. | |
| 4,892,014 A * | 1/1990 | Morell et al. | ................. 477/92 |
| 2002/0180274 A1* | 12/2002 | Suman | ...................... 307/10.2 |
| 2005/0092292 A1* | 5/2005 | Kamimura et al. | ........ 123/396 |
| 2006/0108966 A1* | 5/2006 | Kamio | ............... G05B 19/4062 |
| | | | 318/701 |
| 2006/0158322 A1* | 7/2006 | Pinckney, Sr. | ........ B60R 25/24 |
| | | | 340/426.28 |
| 2006/0207373 A1* | 9/2006 | Amamiya et al. | ....... 74/473.36 |
| 2008/0168853 A1 | 7/2008 | Amamiya et al. | |
| 2008/0173121 A1* | 7/2008 | Kimura et al. | ........... 74/473.12 |
| 2008/0210033 A1 | 9/2008 | Amamiya et al. | |

FOREIGN PATENT DOCUMENTS

| | | |
|---|---|---|
| GB | 2 370 325 A | 6/2002 |
| GB | 2 370 328 A | 6/2002 |
| JP | 58-180327 A | 10/1983 |

(Continued)

*Primary Examiner* — Basil T Jos
(74) *Attorney, Agent, or Firm* — Sughrue Mion, PLLC

(57) ABSTRACT

An ECU executes a program including: a step of starting up an SBW system if lock release is detected; a step of starting up a timer if setting of a reference location corresponding to a P position has been completed; and a step of stopping the SBW system if a power supply is not turned on until a predetermined time T has elapsed.

13 Claims, 5 Drawing Sheets

(56) References Cited

FOREIGN PATENT DOCUMENTS

| | | |
|---|---|---|
| JP | 2002-188722 A | 7/2002 |
| JP | 2004-025938 A | 1/2004 |
| JP | 2004-359010 A | 12/2004 |
| JP | 2005-069406 A | 3/2005 |
| JP | 2006-329238 A | 12/2006 |
| JP | 2007-032774 A | 2/2007 |
| JP | 2007-040350 A | 2/2007 |

\* cited by examiner

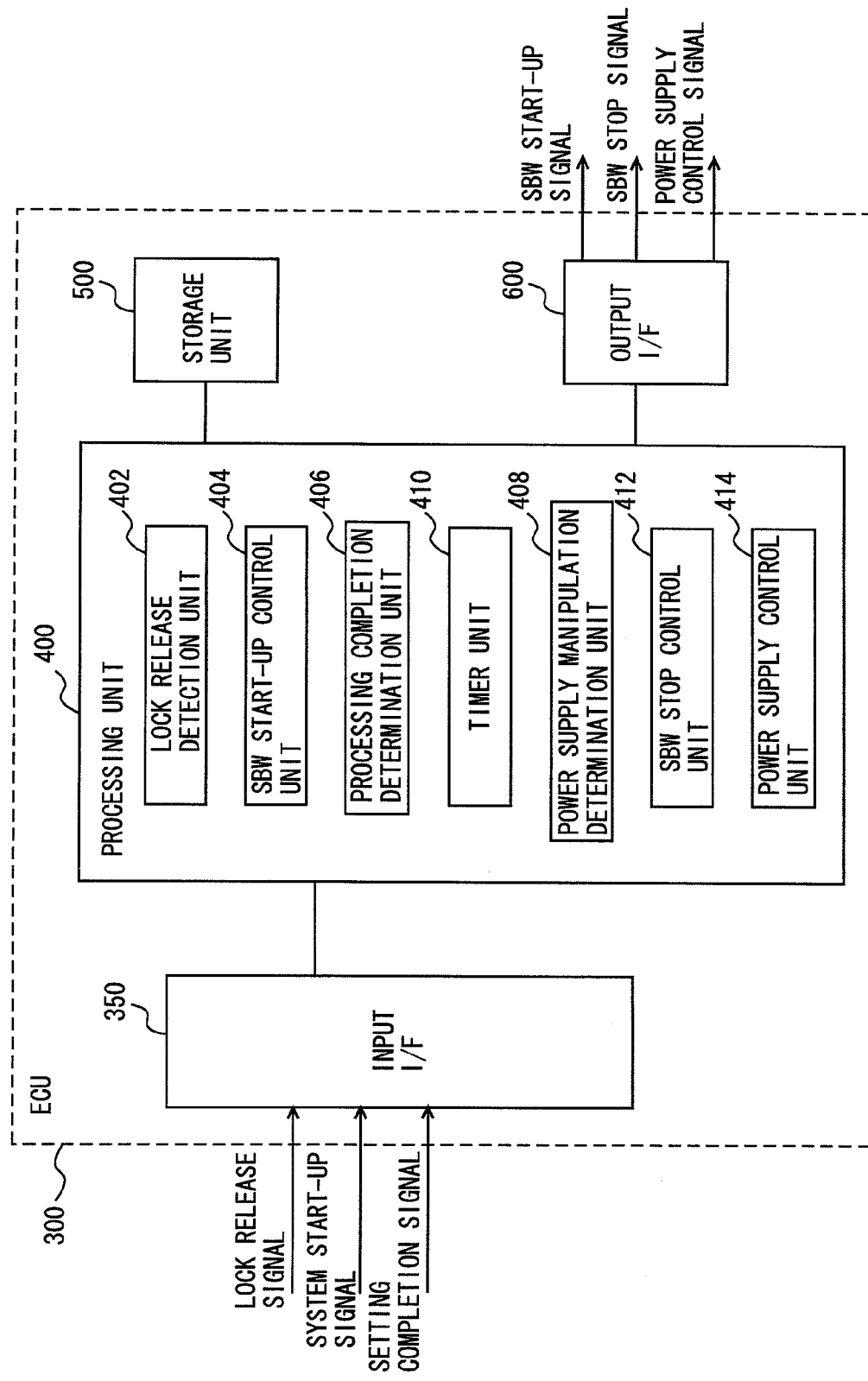
F I G . 4

CONTROL DEVICE AND CONTROL METHOD FOR VEHICLE

TECHNICAL FIELD

The present invention relates to control of correction or learning of an actuation location of an actuator of a shift switching mechanism, and particularly to a technique of performing control of correction or learning with good responsiveness at the time of starting up a vehicle system.

BACKGROUND ART

Conventionally, in shift switching mechanisms changing a shift position of an automatic transmission by electric control according to manipulation of a shift lever by a driver, those equipped with an electric motor (for example, a direct current motor) as a motive power source for switching the shift position have been known.

According to a shift switching mechanism as described above, there is no need to mechanically connect a shift lever with the shift switching mechanism as in a common switching mechanism that directly changes a shift position of an automatic transmission using a manipulation force applied to a shift lever by a driver. Therefore, there is no limitation in layout when these components are mounted in a vehicle, and thus the degree of freedom in design can be increased. Further, there has been an advantage that mounting to a vehicle can be easily performed.

As a shift switching mechanism as described above, for example, Japanese Patent Laying-Open No. 2005-69406 discloses a shift range switching device for an automatic transmission reducing a load on a shift switching mechanism applied when a shift position is switched. The shift range switching device for an automatic transmission includes shift means for rotating an actuator and changing a shift position to one of a plurality of shift positions, storage means for storing the shift position changed by the shift means, first restriction means for restricting rotation of the actuator in a predetermined direction in a first shift position of the plurality of shift positions, and control means for controlling the rotation of the actuator. The control means includes first location setting means for setting a location where the rotation of the actuator is stopped by the first restriction means as a first reference location in the first shift position, power supply control means for permitting cut-off of electric power supply to the shift range switching device in the first shift position, and reference location resetting means for resetting the first reference location by the first location setting means if the electric power supply is resumed after being cut off when the shift position stored by the storage means is uncertain.

According to the shift range switching device for an automatic transmission disclosed in the publication described above, deformation of a detent spring can be prevented or reduced by setting the reference location of the actuator based on a parking position. Since the deformation of the detent spring can be prevented or reduced, the shift switching mechanism has an improved durability. As a result, a load applied on the shift switching mechanism can be reduced.

PRIOR ART DOCUMENTS

Patent Documents

Patent Document 1: Japanese Patent Laying-Open No. 2005-69406

SUMMARY OF THE INVENTION

Problems to be Solved by the Invention

However, the shift range switching device for an automatic transmission disclosed in the publication described above has a problem that, when a driver manipulates a vehicle power supply switch to turn on a power supply relay and set a system of a vehicle to a state where the vehicle can start moving or a preparation state thereof (hereinafter also referred to simply as "starting up a vehicle system"), it takes a long time to complete setting of the reference location of the actuator in the parking position. In addition, the setting of the reference location of the actuator in the parking position should be performed every time when the vehicle system is started up, from the fail-safe viewpoint.

Accordingly, there is a possibility that, even though the driver performs manipulation to start up the vehicle system, it takes a long time to start up the vehicle system, and thus it is impossible to quickly cause the vehicle to start moving corresponding to the driver's intention. As a result, the driver may feel that the vehicle system has been started up with poor responsiveness.

One object of the present invention is to disclose a control device and a control method for a vehicle that start up a vehicle system mounted with a shift switching mechanism driven by an actuator, with good responsiveness.

Means for Solving the Problems

In a control device for a vehicle in accordance with an aspect of the present invention, the vehicle includes a plurality of electric apparatuses mounted in the vehicle, a shift switching mechanism setting a shift position corresponding to a traveling state of the vehicle to one of a plurality of shift positions by driving of an actuator in response to a switching signal, a power supply supplying electric power to the plurality of electric apparatuses, and a power supply relay collectively setting the electric power from the power supply to the plurality of electric apparatuses to one of a supply state and a cut-off state in response to manipulation by a driver. The plurality of shift positions includes at least a parking position. The control device includes: a detection unit detecting a state of a manipulation member to be manipulated by the driver before the supply state is set by the power supply relay; and a control unit controlling the actuator, if a state where the parking position is set in the shift switching mechanism and where the manipulation member has been manipulated by the driver before the supply state is set by the power supply relay is detected, to correct or learn an actuation location of the actuator corresponding to the parking position.

According to the present invention, in a case where the manipulation member to be manipulated by the driver has been manipulated before the supply state is set by the power supply relay, the actuator is controlled to correct or learn the actuation location of the actuator corresponding to the parking position. Thereby, processing to correct or learn the actuation location of the actuator can be started at an earlier stage than that in the case of correcting or learning the actuation location of the actuator at a time point when the driver performs manipulation to start up the vehicle system. As a result, the processing to correct or learn the actuation location of the actuator can be completed at an earlier stage, and thus the vehicle can quickly enter a state where it can start moving after the driver performs the manipulation to start up the vehicle system. This can suppress the driver from feeling that the vehicle system has been started up with poor responsiveness. Therefore, a control device and a control method for a vehicle that start up a vehicle system mounted with a shift switching mechanism driven by an actuator with good responsiveness can be provided.

Preferably, the actuator receives supply of electric power from a power supply system different from a power supply system via the power supply relay. The control device further includes a cut-off unit cutting off supply of the electric power to an electric apparatus related to the driving of the actuator if the supply state is not set by the power supply relay in response to the manipulation by the driver until a predetermined time has elapsed since completion of correction or learning of the actuation location of the actuator.

According to the present invention, if the supply state is not set by the power supply relay in response to the manipulation by the driver until a predetermined time has elapsed since completion of correction or learning of the actuation location of the actuator, it can be said that the driver has no intention to start up the vehicle. Therefore, by cutting off electric power to be supplied to the electric apparatus related to the driving of the actuator in this case, wasted power consumption can be suppressed and running-out of a battery and the like can be prevented.

More preferably, the shift switching mechanism has a restriction member restricting an actuation amount of the actuator. If a state where the manipulation member has been manipulated by the driver is detected, the control unit detects an actuation location of the actuator restricted by the restriction member, and corrects or learns the actuation location of the actuator corresponding to the parking position based on the detected actuation location.

According to the present invention, if a manipulation state in which the driver gets in the vehicle is detected, an actuation location of the actuator restricted by the restriction member is detected, and the actuation location of the actuator corresponding to the parking position is corrected or learned based on the detected actuation location. Thereby, processing to correct or learn the actuation location of the actuator can be started at an earlier stage than that in the case of correcting or learning the actuation location of the actuator at a time point when the driver performs manipulation to start up the vehicle system. As a result, the processing to correct or learn the actuation location of the actuator can be completed at an earlier stage.

More preferably, the control device for a vehicle further includes an encoder detecting the actuation location of the actuator.

According to the present invention, in a case where the actuation location is detected by the encoder, if the manipulation state in which the driver gets in the vehicle is detected, correction or learning of the actuation location of the actuator is performed before the vehicle system is started up. This can improve responsiveness of the starting-up of the vehicle system, and control the actuation location of the actuator with high accuracy.

More preferably, the detection unit detects a manipulation state releasing a lock of a door lock mechanism of the vehicle.

According to the present invention, if the manipulation state releasing the lock of the door lock mechanism of the vehicle is detected, it can be said that the driver has an intention to get in the vehicle. Therefore, by starting processing to correct or learn the actuation location of the actuator at a time point when the manipulation state releasing the lock of the door lock mechanism is detected, the vehicle system can be started up with good responsiveness when the driver performs manipulation to start up the vehicle system.

More preferably, the door lock mechanism releases the lock based on a lock release signal generated by manipulation of the manipulation member by the driver received via wire communication or wireless communication.

According to the present invention, if the lock of the door lock mechanism is released by the driver's lock release manipulation such as remote manipulation or unlocking using a key, it can be said that the driver has an intention to get in the vehicle. Therefore, by starting processing to correct or learn the actuation location of the actuator at a time point when the lock of the door lock mechanism is released by the driver's lock release manipulation, the vehicle system can be started up with good responsiveness when the driver performs manipulation to start up the vehicle system.

More preferably, the manipulation member is a member to be touched by the driver from an outside of the vehicle when the driver releases a lock of a door lock mechanism of the vehicle. The detection unit detects that the driver has touched the member.

According to the present invention, if the driver touches the member to be touched by the driver from the outside of the vehicle to release the lock of the door lock mechanism of the vehicle, it can be said that the driver has an intention to get in the vehicle. Therefore, by starting processing to correct or learn the actuation location of the actuator at a time point when it is detected that the driver has touched the member to be touched by the driver from the outside of the vehicle, the vehicle system can be started up with good responsiveness when the driver performs manipulation to start up the vehicle system.

Effects of the Invention

According to the present invention, in a case where the manipulation member to be manipulated by the driver has been manipulated before the supply state is set by the power supply relay, the actuator is controlled to correct or learn the actuation location of the actuator corresponding to the parking position. Thereby, processing to correct or learn the actuation location of the actuator can be started at an earlier stage than that in the case of correcting or learning the actuation location of the actuator at a time point when the driver performs manipulation to start up the vehicle system. As a result, the processing to correct or learn the actuation location of the actuator can be completed at an earlier stage, and thus the vehicle can quickly enter a state where it can start moving after the driver performs the manipulation to start up the vehicle system. This can suppress the driver from feeling that the vehicle system has been started up with poor responsiveness. Therefore, a control device and a control method for a vehicle that start up a vehicle system mounted with a shift switching mechanism driven by an actuator with good responsiveness can be provided.

BRIEF DESCRIPTION OF THE DRAWINGS

FIG. 4 is a functional block diagram of an ECU as a control device for a vehicle in accordance with the present embodiment.

MODES FOR CARRYING OUT THE INVENTION

Figure 1:
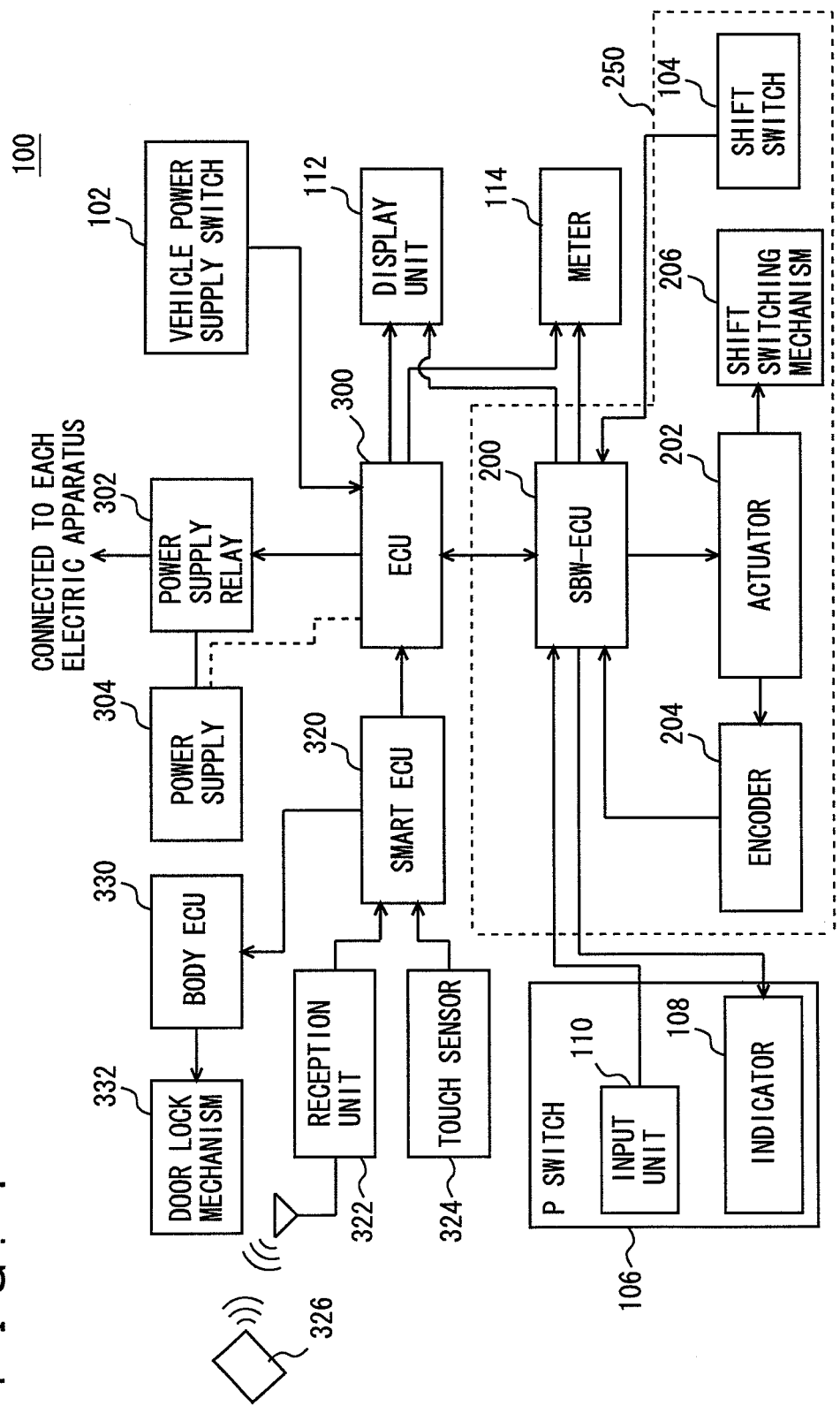
FIG. 1 is a view showing a configuration of a vehicle system.

Hereinafter, an embodiment of the present invention will be described with reference to the drawings. In the description below, identical parts will be designated by the same reference numerals. Since their names and functions are also the same, the detailed description thereof will not be repeated.

FIG. 1 shows a configuration of a vehicle system 100 in the present embodiment. Vehicle system 100 in accordance with the present embodiment includes a vehicle power supply switch 102, a display unit 112, a meter 114, an SBW (Shift by Wire) system 250, an ECU (Electronic Control Unit) 300, a power supply relay 302, a power supply 304, a smart ECU 320, a reception unit 322, a touch sensor 324, a body ECU 330, and a door lock mechanism 332.

When vehicle power supply switch 102 is turned on, electric power is supplied from power supply 304 to each of a plurality of electric apparatuses mounted in a vehicle, vehicle system 100 enters a state where the vehicle can start moving and a preparation state before transition to the state where the vehicle can start moving, and thus the vehicle is started up. Vehicle power supply switch 102 transmits a system start-up signal to ECU 300 in response to manipulation by a driver.

Although a hybrid vehicle having an engine and a rotating electric machine as drive sources will be described as an example of the vehicle in the present embodiment, the vehicle may be a vehicle having only an engine as a drive source, or an electric car having only a rotating electric machine as a drive source. In a hybrid vehicle, the state where the vehicle can start moving refers to a state where the vehicle starts moving if a driver manipulates an accelerator pedal. The preparation state before transition to the state where the vehicle can start moving refers to a state where, for example, some of the plurality of electric apparatuses mounted in the vehicle (such as an audio apparatus) are started up.

Power supply 304 supplies the electric power to the plurality of electric apparatuses mounted in the vehicle. Power supply relay 302 is provided between power supply 304 and the plurality of electric apparatuses. Power supply relay 302 switches the electric power from power supply 304 to the plurality of electric apparatuses, from one to the other of a supply state and a cut-off state, by control of ECU 300.

ECU 300 is connected to vehicle power supply switch 102. When ECU 300 receives the system start-up signal from vehicle power supply switch 102, ECU 300 controls power supply relay 302 to switch from the cut-off state to the supply state described above.

Smart ECU 320 controls door lock mechanism 332 via body ECU 330, based on various signals from a smart key 326 carried by the driver.

Reception unit 322 receives the various signals from smart key 326, and transmits the received signals to smart ECU 320.

When the driver touches a contact point provided outside the vehicle, touch sensor 324 transmits a signal indicating that the driver has touched the contact point to smart ECU 320.

Based on the signal received from reception unit 322 or touch sensor 324, smart ECU 320 transmits a signal for releasing a lock of door lock mechanism 332 (hereinafter referred to as a lock release signal) or a signal for setting a lock (hereinafter referred to as a lock signal) described later, to body ECU 330.

Body ECU 330 controls door lock mechanism 332 based on the lock release signal or the lock signal from smart ECU 320. Specifically, if body ECU 330 receives the lock release signal, body ECU 330 drives an actuator (not shown) of door lock mechanism 332 to release a lock of a door (a front, rear, or back door) of the vehicle. Alternatively, if body ECU 330 receives the lock signal, body ECU 330 drives the actuator of door lock mechanism 332 to lock a door of the vehicle.

In door lock mechanism 332, the lock is released by control of body ECU 330 based on the lock release signal generated by manipulation of a manipulation member by the driver received via wire communication or wireless communication.

It is to be noted that the manipulation of the manipulation member by the driver is not limited to manipulation of smart key 326 and touch sensor 324.

SBW system 250 includes an SBW-ECU 200, a shift switch 104, a P switch 106, an actuator 202, an encoder 204, and a shift switching mechanism 206. SBW system 250 is used to change a shift position of the vehicle, and functions as a shift-by-wire system changing the shift position by electric control.

Specifically, shift switching mechanism 206 changes the shift position by driving of actuator 202.

P switch 106 is a switch for switching the shift position from one to the other of a parking position (hereinafter referred to as a "P position") and a position other than the parking position (hereinafter referred to as a "non-P position"), and includes an indicator 108 for indicating the state of the switch to the driver, and an input unit 110 receiving an instruction from the driver.

The driver inputs an instruction to change the shift position to the P position through input unit 110. Input unit 110 may be a momentary switch. A P command signal indicating the instruction from the driver received by input unit 110 is transmitted to SBW-ECU 200. It is to be noted the shift position may be switched from the non-P position to the P position by a component other than P switch 106 as described above.

To change the shift position to one of the P position and the non-P position, SBW-ECU 200 controls an operation of actuator 202 driving shift switching mechanism 206, and presents a current state of the shift position in indicator 108. If the driver depresses input unit 110 when the shift position is the non-P position, SBW-ECU 200 switches the shift position from the non-P position to the P position, and presents that the current shift position is the P position in indicator 108.

Actuator 202 is configured of a switched reluctance motor (hereinafter referred to as an "SR motor"), and receives an actuator control signal from SBW-ECU 200 and drives shift switching mechanism 206. Encoder 204 rotates integrally with actuator 202, and detects a rotational state of the SR motor. Encoder 204 of the present embodiment is a rotary encoder outputting A-phase, B-phase, and Z-phase signals. SBW-ECU 200 obtains the signals output from encoder 204 to grasp the rotational state of the SR motor, and controls energization for driving the SR motor.

Shift switch 104 is a switch for changing the shift position to a position such as a drive (D) position, a reverse (R) position, a neutral (N) position, and a brake (B) position, and releasing the P position when the P position is selected. A shift signal indicating an instruction from the driver received by shift switch 104 is transmitted to SBW-ECU 200. SBW-ECU 200 presents the current state of the shift position in meter 114, based on the shift signal indicating the instruction from the driver.

ECU 300 manages an entire operation of vehicle system 100. Display unit 112 displays an instruction, a warning, and the like to the driver issued by ECU 300 or SBW-ECU 200. In the present embodiment, ECU 300 is connected to smart ECU 320 and SBW-ECU 200. ECU 300 receives the lock release signal from smart ECU 320, and receives a signal indicating completion of processing to confirm the P position described later from SBW-ECU 200. Meter 114 presents the state of an apparatus in the vehicle, the state of the shift position, and the like.

Although a description is given in the present embodiment on the assumption that ECU 300 controls an electric apparatus related to the power supply for convenience of explanation, for example, an ECU different from ECU 300 (for example, a power supply ECU) may control an electric apparatus related to the power supply.

Figure 2:
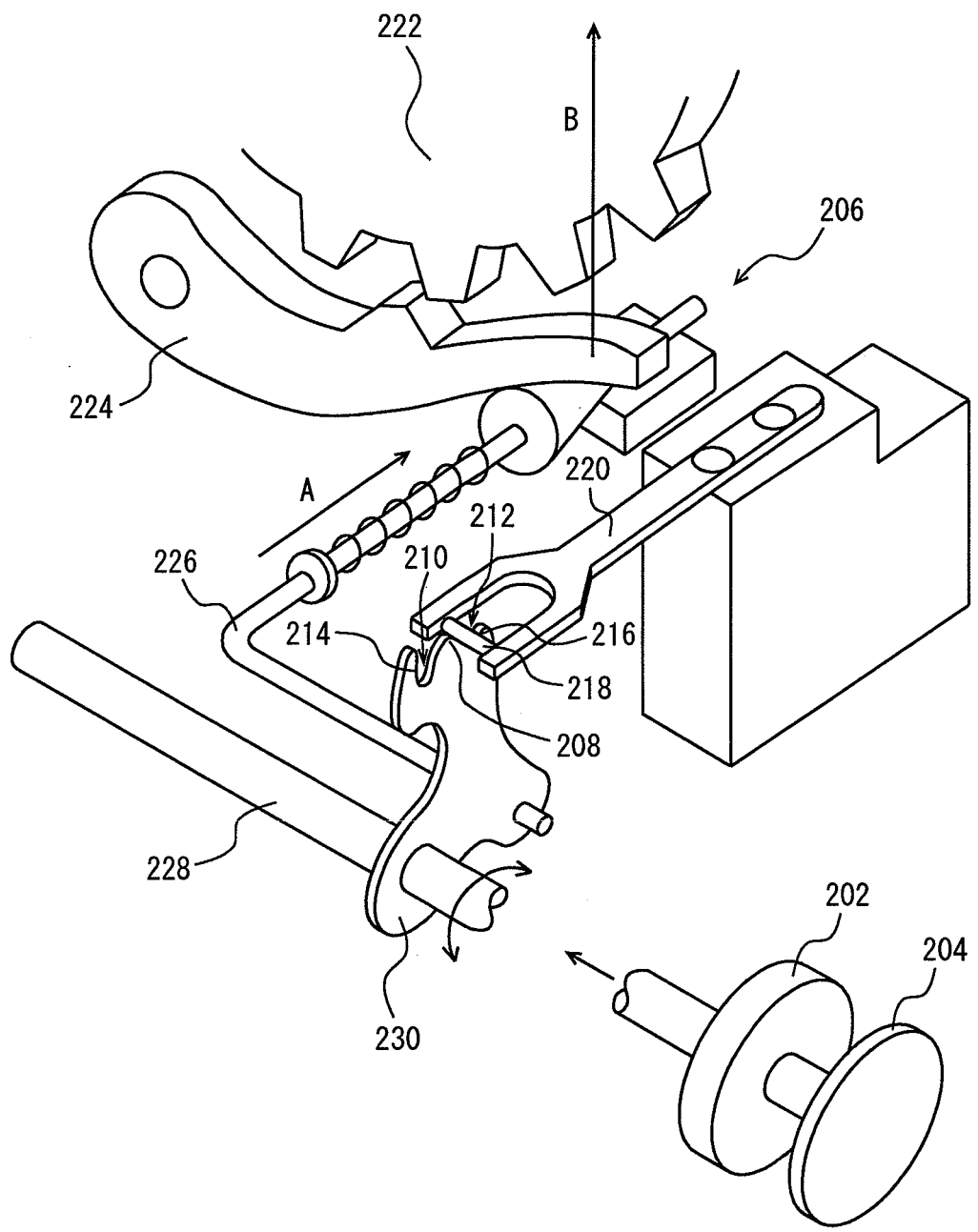
FIG. 2 is a view showing a configuration of a shift switching mechanism.

FIG. 2 shows a configuration of shift switching mechanism 206. Hereinafter, a description will be given on the assumption that the shift position refers to the P position and the non-P position, and does not include the R, N, and D positions in the non-P position. However, the R, N, and D positions may be included. Specifically, although a description will be given of a two-position configuration having the P position and the non-P position in the present embodiment, a four-position configuration having the P position and the non-P position including the R, N, and D positions may be employed.

Shift switching mechanism 206 includes a shaft 228 rotated by actuator 202, a detent plate 230 rotated in accordance with rotation of shaft 228, a rod 226 operated in accordance with rotation of detent plate 230, a parking lock gear 222 fixed to a rotary shaft, a parking lock pole 224 for locking parking lock gear 222, and a detent spring 220 and a roller 218 limiting the rotation of detent plate 230 and fixing the shift position. Detent plate 230 is driven by actuator 202 to change the shift position. Further, encoder 204 functions as count means obtaining a count value in accordance with a rotational amount of actuator 202.

FIG. 2 shows a state where the shift position is the non-P position. Since parking lock pole 224 does not lock parking lock gear 222 in this state, rotation of a drive shaft of the vehicle is not prevented. When shaft 228 is rotated by actuator 202 in a clockwise direction from this state, rod 226 is pushed via detent plate 230 in a direction indicated by an arrow A shown in FIG. 2, and parking lock pole 224 is pushed up by a tapered portion provided at a tip end of rod 226 in a direction indicated by an arrow B shown in FIG. 2. In accordance with the rotation of detent plate 230, roller 218 of detent spring 220 located at one of two valleys provided at the top of detent plate 230, that is, a non-P position location 212, passes over a peak 208 and moves to the other valley, that is, a P position location 210. Roller 218 is provided to detent spring 220 to be rotatable about an axial direction thereof. When detent plate 230 is rotated to allow roller 218 to be located at P position location 210, parking lock pole 224 is pushed up to a location where a projected portion of parking lock pole 224 engages between teeth of parking lock gear 222. Thereby, the drive shaft of the vehicle is mechanically fixed, and the shift position is switched from the non-P position to the P position.

In vehicle system 100 in accordance with the present embodiment, SBW-ECU 200 controls the rotational amount of actuator 202 so as to reduce impact given when roller 218 of detent spring 220 falls after passing over peak 208, in order to reduce a load on the components of shift switching mechanism 206 such as detent plate 230, detent spring 220, and shaft 228, applied when the shift position is changed.

A surface located on a side away from peak 208 in each of the valleys in detent plate 230 will be referred to as a wall. Specifically, the wall is present at a location with which roller 218 of detent spring 220 collides when roller 218 passes over peak 208 and falls into the valley in a state where control by SBW-ECU 200 described below is not performed. The wall at P position location 210 will be referred to as a "P wall", and the wall at non-P position location 212 will be referred to as a "non-P wall".

When roller 218 moves from P position location 210 to non-P position location 212, SBW-ECU 200 controls actuator 202 such that non-P wall 216 does not collide with roller 218, or non-P wall 216 collides with roller 218 with less impact force. Specifically, SBW-ECU 200 stops rotation of actuator 202 at a location immediately before a location where non-P wall 216 collides with roller 218. The former location will be referred to as a "non-P target rotational location".

In addition, when roller 218 moves from non-P position location 212 to P position location 210, SBW-ECU 200 controls actuator 202 such that P wall 214 does not collide with roller 218, or P wall 214 collides with roller 218 with less impact force. Specifically, SBW-ECU 200 stops rotation of actuator 202 at a location immediately before a location where P wall 214 collides with roller 218. The former location will be referred to as a "P target rotational location".

The control of actuator 202 by SBW-ECU 200 can drastically reduce the load on the components of shift switching mechanism 206 such as detent plate 230, detent spring 220, and shaft 228, applied when the shift position is changed. By reducing the load, reduction in weight and cost of the components of shift switching mechanism 206 can also be achieved.

Actuator 202 rotates detent plate 230 provided to shaft 228. Rotations in predetermined directions are respectively restricted by P wall 214 and non-P wall 216 formed in detent plate 230.

The current shift position is determined if the rotational amount of actuator 202 is within a range of a predetermined rotational amount from a P wall location or a non-P wall location.

Specifically, if a rotational location of actuator 202 (a relative location of roller 218 in detent plate 230) based on the rotational amount detected by encoder 204 is within a first range from the P wall location to a predetermined location, SBW-ECU 200 determines that the shift position is the P position.

On the other hand, if the rotational location of actuator 202 based on the rotational amount detected by encoder 204 is within a second range from the non-P wall location to a predetermined location, SBW-ECU 200 determines that the shift position is the non-P position.

SBW-ECU 200 detects the rotational amount of actuator 202 by calculating an absolute value of a difference between a counter value at the P wall location (or the non-P wall location) and a counter value sensed by encoder 204 while actuator 202 is rotating.

In addition, if the rotational location of actuator 202 is neither in the first range nor in the second range, SBW-ECU 200 determines that the shift position is not fixed or the shift position is being changed.

The P target rotational location is a location where P wall 214 does not collide with roller 218 of detent spring 220 when the shift position is switched from the non-P position to the P position, and is set with a predetermined margin from the P wall location. The margin is set with an allowance in consideration of backlash due to a temporal change and the like. Thus, the temporal change can be absorbed until shift switching mechanism 206 is used a certain number of times, and collision of P wall 214 with roller 218 when the shift position is changed can be avoided.

The non-P target rotational location is a location where non-P wall 216 does not collide with roller 218 of detent spring 220 when the shift position is switched from the P position to the non-P position, and is set with a predetermined margin from the non-P wall location. The margin is set with an allowance in consideration of backlash due to a temporal change and the like. Thus, the temporal change can be absorbed until shift switching mechanism 206 is used a certain number of times, and collision of non-P wall 216 with roller 218 when the shift position is switched can be avoided. The margin from the non-P wall location and the margin from the P wall location are not necessarily identical, and may be different depending on the shape and the like of detent plate 230.

A method of controlling actuator 202 has been described above on the assumption that the P wall location and the non-P wall location are detected. The P wall location or the non-P wall location serves as a reference location for setting a range for determining the shift position and the target rotational location in P position location 210 or non-P position location 212. A description will be given below of a method of controlling the location of actuator 202, specifically a method of detecting a wall location serving as the reference location, using encoder 204 which detects relative location information.

SBW-ECU 200 functions as control means for rotating actuator 202, and setting means for setting the P wall location, that is, the reference location, of actuator 202. To detect and control the P wall location, firstly, detent plate 230 is rotated by actuator 202 in the clockwise direction, that is, in a direction in which P wall 214 moves toward roller 218 of detent spring 220, to bring P wall 214 into contact with roller 218. P wall 214 in the P position location functions as a restriction member restricting the clockwise rotation of actuator 202. P wall 214 may constitute the restriction member in cooperation with detent spring 220 and roller 218.

Namely, SBW-ECU 200 sets a location of at least one of a plurality of shift positions based on the rotational location of actuator 202 restricted by the restriction member.

Figure 3:
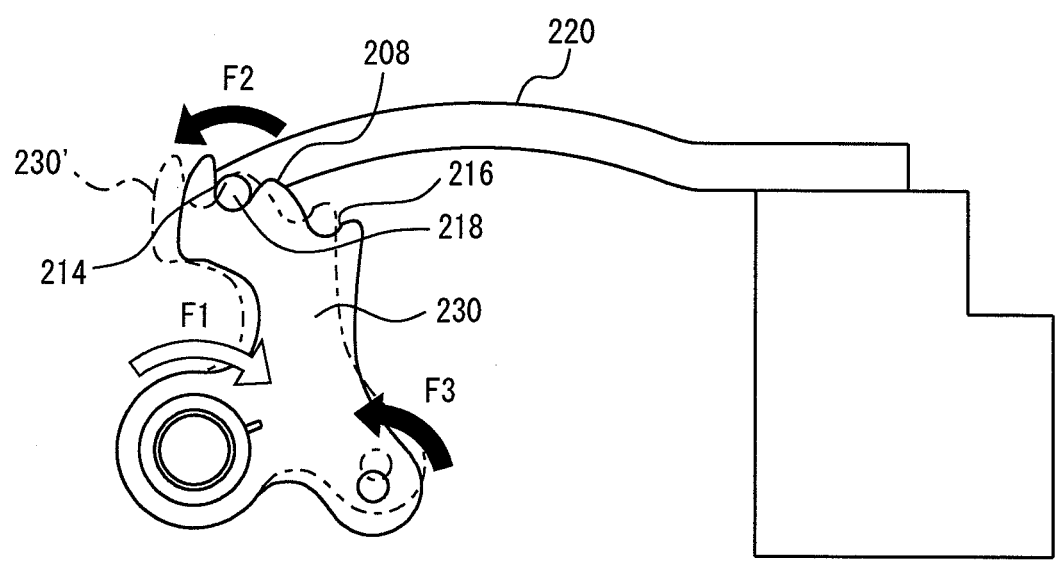
FIG. 3 is a view showing a change in a detent spring upon collision with a P wall.

In FIG. 3, an arrow F1 indicates a rotational force by actuator 202, an arrow F2 indicates a spring force by detent spring 220, and an arrow F3 indicates a pushing-back force by rod 226. A detent plate 230' indicated by a dotted line represents a location where P wall 214 comes into contact with roller 218. Therefore, detection of the location of detent plate 230' is equivalent to detection of the location of P wall 214.

Even after P wall 214 comes into contact with roller 218, detent plate 230 is rotated in the clockwise direction from the location indicated by the dotted line, by rotational force F1 of actuator 202, against the spring force of detent spring 220. Thereby, detent spring 220 flexes, increasing spring force F2 as well as pushing-back force F3 by rod 226. When rotational force F1 is balanced with spring force F2 and pushing-back force F3, the rotation of detent plate 230 is stopped.

Whether or not the rotation of detent plate 230 is stopped is determined based on a state of the count value obtained by encoder 204. If a minimum value or a maximum value of the count value of encoder 204 does not change for a predetermined time, SBW-ECU 200 determines that the rotation of detent plate 230 and actuator 202 is stopped. Which of the minimum value and the maximum value of the count value is to be monitored may be set depending on encoder 204. In any case, a state where the minimum value or the maximum value does not change for a predetermined time means that detent plate 230 is stationary.

SBW-ECU 200 detects a location of detent plate 230 when its rotation is stopped as a provisional P wall location (hereinafter referred to as a "provisional P wall location"), and calculates a flexure amount or flexure angle of detent spring 220. Calculation of the flexure amount or flexure angle is performed using a map showing the relationship of the flexure amount or flexure angle corresponding to an applied voltage to actuator 202 that is held in advance in SBW-ECU 200. From the map, SBW-ECU 200 calculates the flexure amount or flexure angle corresponding to the applied voltage to actuator 202 when the provisional P wall location is detected. The map may use a power supply voltage instead of the applied voltage to actuator 202. The power supply voltage is monitored by SBW-ECU 200 through ECU 300, and can readily be detected. In this case, the map is prepared in consideration of a voltage drop due to a wire harness from power supply 304 to actuator 202, and the like. SBW-ECU 200 uses this map to make mapping correction of the provisional P wall location based on the calculated flexure amount or flexure angle, and confirms the mapping-corrected location as the P wall location. By confirming the P wall location, the P target rotational location can be set. Instead of the map showing the relationship of the flexure amount or flexure angle corresponding to the applied voltage, a map showing the relationship of the flexure amount or flexure angle corresponding to an output torque of actuator 202 may be used. Further, instead of being calculated using a map, the flexure amount or flexure angle may be detected by a sensor provided to detect it.

With regard to setting of the non-P wall location, the reference location can be set as in the method of setting the P wall location, and thus a detailed description will not be repeated.

As described above, when SBW system 250 is started up, SBW-ECU 200 rotates actuator 202 to bring the wall in detent plate 230 into contact with roller 218 of detent spring 220. Then, by detecting a contact location thereof, a location of the wall in detent plate 230 corresponding to the reference location of the shift position is detected. By setting the wall location as the reference location, the rotation of actuator 202 can also be controlled appropriately using encoder 204 that can detect only relative location information. That is, switching of the shift position can be performed appropriately without using a neutral start switch or the like.

In the present embodiment, by setting the P wall location every time when the driver turns on vehicle power supply switch 102 to start up vehicle system 100, an actuation location of actuator 202 corresponding to the parking position is corrected or learned.

The vehicle having such a configuration has a problem that, if the P wall location is set at a time point when manipulation to start up vehicle system 100 is performed, it takes a long time to complete setting of the reference location of the actuator in the P position.

Accordingly, there is a possibility that, even though the driver performs the manipulation to start up vehicle system 100, it takes a long time to start up vehicle system 100, and thus it is impossible to quickly cause the vehicle to start moving corresponding to the driver's intention. As a result, the driver may feel that vehicle system 100 has been started up with poor responsiveness.

Thus, the present embodiment is characterized in that, if a state where the parking position is set in shift switching mechanism 206 and where the manipulation member has been manipulated by the driver before the supply state is set by power supply relay 302 is detected, ECU 300 controls the actuator to correct or learn the actuation location of the actuator corresponding to the P position.

Further, if the supply state is not set by power supply relay 302 in response to manipulation by the driver until a predetermined time has elapsed since completion of correction or learning of the actuation location of actuator 202, ECU 300 cuts off supply of the electric power to an electric apparatus related to the driving of actuator 202. In the present embodiment, the electric apparatus related to the driving of actuator 202 is an electric apparatus constituting SBW system 250.

FIG. 4 shows a functional block diagram of ECU 300 as a control device for a vehicle in accordance with the present embodiment. As shown in FIG. 4, ECU 300 includes an input interface (hereinafter referred to as an input I/F) 350, a processing unit 400, a storage unit 500, and an output interface (hereinafter referred to as an output I/F) 600.

Input I/F 350 receives the lock release signal from smart ECU 320, the system start-up signal from vehicle power supply switch 102, and a setting completion signal from SBW-ECU 200, and transmits the signals to processing unit 400.

Processing unit 400 includes a lock release detection unit 402, an SBW start-up control unit 404, a processing completion determination unit 406, a timer unit 410, a power supply manipulation determination unit 408, an SBW stop control unit 412, and a power supply control unit 414.

Lock release detection unit 402 determines whether or not it receives the lock release signal generated when the driver manipulates smart key 326 to release the lock of door lock mechanism 332 or the driver touches touch sensor 324. Lock release detection unit 402 may, for example, turn on a lock release determination flag when it receives the lock release signal.

Lock release detection unit 402 is satisfactory as long as it can detect manipulation to release the lock of door lock mechanism 332 by the driver, and is not intended to detect whether or not the lock has been released, by particularly focusing on a signal from smart key 326 or touch sensor 324.

If it is determined that the lock release signal is received, SBW start-up control unit 404 starts up SBW system 250. Specifically, SBW start-up control unit 404 transmits an SBW start-up signal indicating to start up SBW system 250 to SBW-ECU 200 via output I/F 600. When SBW-ECU 200 receives the SBW start-up signal, SBW-ECU 200 performs processing to set the reference location of actuator 202 corresponding to the P position. SBW start-up control unit 404 may, for example, transmit the start-up signal to SBW system 250 if the lock release determination flag is on.

Processing completion determination unit 406 determines whether or not the processing to set the reference location of actuator 202 corresponding to the P position has been completed in SBW system 250. In the present embodiment, SBW-ECU 200 transmits the setting completion signal completing the processing to set the reference location of actuator 202 corresponding to the P position to ECU 300. When processing completion determination unit 406 receives the setting completion signal from SBW-ECU 200, processing completion determination unit 406 determines that setting of the reference location of actuator 202 corresponding to the P position has been completed in SBW system 250.

Processing completion determination unit 406 may, for example, turn on a setting completion flag when it determines that the processing to set the reference location of actuator 202 corresponding to the P position has been completed in SBW system 250.

When processing completion determination unit 406 determines that the processing to set the reference location of actuator 202 corresponding to the P position has been completed, timer unit 410 starts up a timer. Specifically, timer unit 410 measures a time that has elapsed since completion of the setting of the reference location, by resetting a counter to an initial value and adding a predetermined value for each predetermined calculation cycle. Timer unit 410 measures, for example, a time that has elapsed since the turning-on of the setting completion flag.

Power supply manipulation determination unit 408 determines whether or not vehicle power supply switch 102 is turned on. When power supply manipulation determination unit 408 receives the system start-up signal, it determines that vehicle power supply switch 102 is turned on. Power supply manipulation determination unit 408 may, for example, turn on a power supply manipulation determination flag when vehicle power supply switch 102 is turned on.

If the time measured in timer unit 410 indicates that a predetermined time T has elapsed, SBW stop control unit 412 transmits an SBW stop signal to SBW-ECU 200 via output I/F 600 to stop SBW system 250.

When SBW-ECU 200 receives the SBW stop signal, SBW-ECU 200 cuts off supply of the electric power to the electric apparatus related to the driving of actuator 202, and stops a function.

Power supply control unit 414 transmits a power supply control signal via output I/F 600 to turn on power supply relay 302 when vehicle power supply switch 102 is turned on. When power supply relay 302 is turned on, the vehicle enters a state where it can start moving (a READY-ON state).

Further, in the present embodiment, although lock release detection unit 402, SBW start-up control unit 404, processing completion determination unit 406, timer unit 410, power supply manipulation determination unit 408, SBW stop control unit 412, and power supply control unit 414 are each described as functioning as software implemented by a CPU as processing unit 400 executing a program stored in storage unit 500, they may be implemented by hardware. Such a program is recorded in a storage medium and mounted in the vehicle.

Storage unit 500 stores various information, programs, threshold values, maps, and the like, and data is read by processing unit 400 or stored from processing unit 400, if needed.

Figure 5:
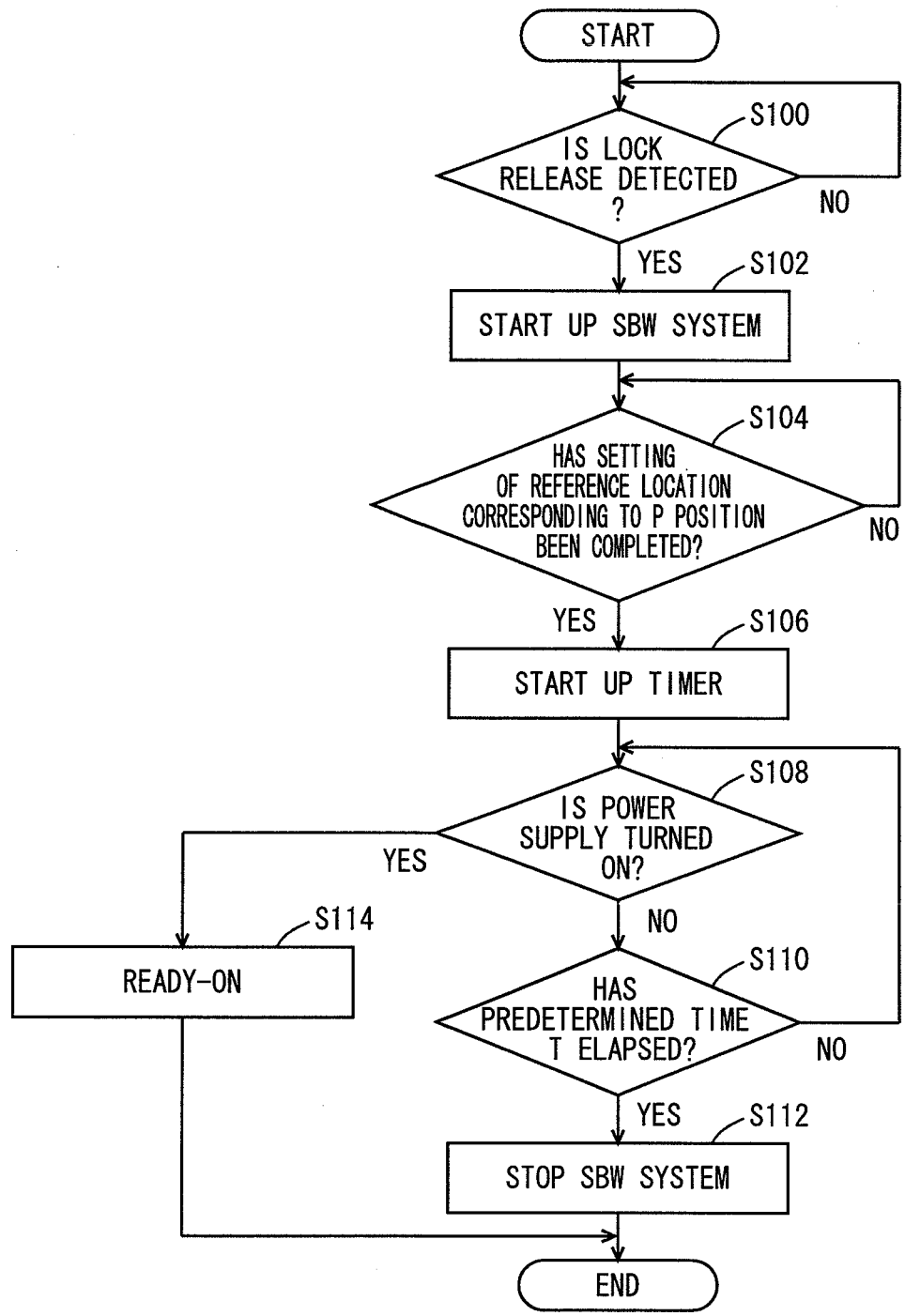
FIG. 5 is a flowchart illustrating a control structure of a program executed by the ECU as the control device for a vehicle in accordance with the present embodiment.

Referring to FIG. 5, a control structure of a program executed by ECU 300 as the control device for a vehicle in accordance with the present embodiment will be described.

In step (hereinafter referred to as "S") 100, ECU 300 determines whether or not the lock release signal is detected. If the lock release signal is detected (YES in S100), the processing proceeds to S102. Otherwise (NO in S100), the processing returns to S100.

In S102, ECU 300 starts up SBW system 250. In S104, ECU 300 determines whether or not setting of the reference location corresponding to the P position has been completed in SBW system 250. If the setting of the reference location has been completed (YES in S104), the processing proceeds to S106. Otherwise (NO in S104), the processing returns to S104.

In S106, ECU 300 starts up the timer. In S108, ECU 300 determines whether or not vehicle power supply switch 102 is turned on. If vehicle power supply switch 102 is turned on (YES in S108), the processing proceeds to S114. Otherwise (NO in S108), the processing proceeds to S110.

In S110, ECU 300 determines whether or not predetermined time T has elapsed since the starting-up of the timer. If predetermined time T has elapsed (YES in S110), the processing proceeds to S112. Otherwise (NO in S110), the processing returns to S108.

In S112, ECU 300 stops SBW system 250. In S114, ECU 300 turns on power supply relay 302 to set vehicle system 100 to the READY-ON state.

An operation of ECU 300 as the control device for a vehicle in accordance with the present embodiment based on the structure and the flowchart as described above will be described.

For example, a case is assumed where the vehicle is parked, the shift position is the parking position, no one gets in the vehicle, and the vehicle is locked. If the driver manipulates smart key 326 from a location away from the vehicle to perform manipulation to release the lock of door lock mechanism 332 of the vehicle, the lock release signal is output from smart key 326. If the lock release signal output from smart key 326 is received at reception unit 322, the lock release signal is transmitted to ECU 300 via smart ECU 320.

When the lock release signal is received at reception unit 322, smart ECU 320 transmits the lock release signal to body ECU 330. Body ECU 330 controls the actuator of door lock mechanism 332 to release the lock of door lock mechanism 332 based on the lock release signal.

On the other hand, if ECU 300 receives the lock release signal from smart key 326 or touch sensor 324 (YES in S100), ECU 300 starts up SBW system 250 (S102).

When SBW system 250 is started up, SBW-ECU 200 performs processing to set the reference location of actuator 202 corresponding to the P position. If setting of the reference location of actuator 202 corresponding to the P position has been completed (YES in S104), the timer is started up (S106), and whether or not vehicle power supply switch 102 is turned on is determined (S108).

If vehicle power supply switch 102 is not turned on until predetermined time T has elapsed since the completion of the setting of the reference location of actuator 202 corresponding to the P position (YES in S110), SBW system 250 is stopped (S112).

On the other hand, if vehicle power supply switch 102 is turned on until predetermined time T has elapsed since the completion of the setting of the reference location corresponding to the P position (YES in S108), power supply relay 302 is turned on and vehicle system 100 enters the READY-ON state.

As has been described above, according to the control device for a vehicle in accordance with the present embodiment, in a case where the manipulation member to be manipulated by the driver has been manipulated before the supply state is set by the power supply relay, the actuator is controlled to correct or learn the actuation location of the actuator corresponding to the parking position. Thereby, processing to correct or learn the actuation location of the actuator can be started at an earlier stage than that in the case of correcting or learning the actuation location of the actuator at a time point when the driver performs manipulation to start up the vehicle system. As a result, the processing to correct or learn the actuation location of the actuator can be completed at an earlier stage, and thus the vehicle can quickly enter a state where it can start moving after the driver performs the manipulation to start up the vehicle system. This can suppress the driver from feeling that the vehicle system has been started up with poor responsiveness. Therefore, a control device and a control method for a vehicle that start up a vehicle system mounted with a shift switching mechanism driven by an actuator with good responsiveness can be provided.

Although the manipulation member releasing the lock of the door lock mechanism has been described as an example of the manipulation member in the present embodiment, the manipulation member is not particularly limited to a manipulation member for releasing a lock, as long as it is used before the supply state is set by the power supply relay. For example, the reference location of the actuator corresponding to the P position may be set when opening/closing of a door is detected, or when depressing of a brake pedal after the driver is seated is detected, or when seating of the driver is detected by a seating sensor provided to a seat.

Further, if the power supply relay is not set to a state where electric power is supplied to the plurality of electric apparatuses in response to manipulation by the driver until predetermined time T has elapsed since completion of correction or learning of the actuation location of the actuator, it can be said that the driver has no intention to start up the vehicle. Therefore, by cutting off electric power to be supplied to the electric apparatus related to the driving of the actuator in such a case, wasted power consumption can be suppressed and running-out of a battery and the like can be prevented.

It should be understood that the embodiment disclosed herein is illustrative and non-restrictive in every respect. The scope of the present invention is defined by the scope of the claims, rather than the description above, and is intended to include any modifications within the scope and meaning equivalent to the scope of the claims.

DESCRIPTION OF THE REFERENCE SIGNS

100: vehicle system, 102: vehicle power supply switch, 104: shift switch, 106: P switch, 108: indicator, 110: input unit, 112: display unit, 114: meter, 200: SBW-ECU, 202: actuator, 204: encoder, 206: shift switching mechanism, 208: peak, 210: P position location, 212: non-P position location, 214: P wall, 216: non-P wall, 220: detent spring, 222: parking lock gear, 224: parking lock pole, 226: rod, 228: shaft, 230: detent plate, 250: SBW system, 300: ECU, 302: power supply relay, 304: power supply, 322: reception unit, 330: body ECU, 332: door lock mechanism, 350: input UF, 400: processing unit, 402: lock release detection unit, 404: SBW start-up control unit, 406: processing completion determination unit, 408: power supply manipulation determination unit, 410: timer unit, 412: SBW stop control unit, 414: power supply control unit, 500: storage unit, 600: output I/F.

The invention claimed is:

1. A control device for a vehicle, said vehicle including a plurality of electric apparatuses mounted in said vehicle, a shift switching mechanism setting a shift position corresponding to a traveling state of said vehicle to one of a plurality of shift positions by driving of an actuator in response to a switching signal, a power supply supplying electric power to said plurality of electric apparatuses, and a power supply relay collectively setting the electric power from said power supply to said plurality of electric apparatuses to one of a supply state and a cut-off state in response to manipulation by a driver, wherein the supply state is a state when the vehicle can start moving, said plurality of shift positions including at least a parking position, the control device comprising:
an electronic control unit (ECU) configured with executable program logic, to perform:
detecting a state of a manipulation member to be manipulated by said driver before said supply state is set by said power supply relay; and
controlling said actuator to correct or learn an actuation location of said actuator corresponding to said parking position, when (i) a state where said manipulation member has been manipulated by said driver before said supply state is set by said power supply relay is detected, (ii) the shift position in said shift switching mechanism is said parking position, and (iii) a door lock mechanism releases a lock by manipulation of said manipulation member, wherein
said door lock mechanism releases said lock based on a lock release signal generated by manipulation of said manipulation member.

2. The control device for a vehicle according to claim 1, wherein
said actuator receives supply of electric power from a power supply system different from a power supply system via said power supply relay, and
said control device further comprises a cut-off unit cutting off supply of the electric power to an electric apparatus related to the driving of said actuator if said supply state is not set by said power supply relay in response to the manipulation by said driver until a predetermined time has elapsed since completion of correction or learning of the actuation location of said actuator.

3. The control device for a vehicle according to claim 1, wherein
said shift switching mechanism has a restriction member restricting an actuation amount of said actuator, and
if a state where said manipulation member has been manipulated by said driver is detected, said control unit detects an actuation location of said actuator restricted by said restriction member, and corrects or learns the actuation location of said actuator corresponding to said parking position based on said detected actuation location.

4. The control device for a vehicle according to claim 1, further comprising an encoder detecting the actuation location of said actuator.

5. The control device for a vehicle according to claim 1, wherein the lock release signal generated by manipulation of said manipulation member by said driver is received via wire communication or wireless communication.

6. The control device for a vehicle according to claim 1, wherein
said manipulation member is a member to be touched by said driver from an outside of said vehicle when said driver releases the lock of the door lock mechanism of said vehicle, and
said ECU configured with executable program logic performs detecting that said driver has touched said member.

7. A control method for a vehicle, said vehicle including a plurality of electric apparatuses mounted in said vehicle, a shift switching mechanism setting a shift position corresponding to a traveling state of said vehicle to one of a plurality of shift positions by driving of an actuator in response to a switching signal, a power supply supplying electric power to said plurality of electric apparatuses, and a power supply relay collectively setting the electric power from said power supply to said plurality of electric apparatuses to one of a supply state and a cut-off state in response to manipulation by a driver, wherein the supply state is a state when the vehicle can start moving, said plurality of shift positions including at least a parking position, the control method comprising the steps of:
detecting, by an electronic control unit (ECU) configured with executable program logic, a state of a manipulation member to be manipulated by said driver before said supply state is set by said power supply relay; and
controlling, by said ECU, said actuator to correct or learn an actuation location of said actuator corresponding to said parking position, when (i) state is detected where said manipulation member has been manipulated by said driver before said supply state is set by said power supply relay, (ii) the shift position in said shift switching mechanism is said parking position, and (iii) a door lock mechanism releases a lock by manipulation of said manipulation member, wherein
releasing, by said door lock mechanism, said lock based on a lock release signal generated by manipulation of said manipulation member.

8. The control method for a vehicle according to claim 7, wherein
said actuator receives supply of electric power from a power supply system different from a power supply system via said power supply relay, and
said control method further comprises the step of cutting off supply of the electric power to an electric apparatus related to the driving of said actuator if said supply state is not set by said power supply relay in response to the manipulation by said driver until a predetermined time has elapsed since completion of correction or learning of the actuation location of said actuator.

9. The control method for a vehicle according to claim 7, wherein
said shift switching mechanism has a restriction member restricting an actuation amount of said actuator, and
if a state where said manipulation member has been manipulated by said driver is detected, the step of controlling said actuator detects an actuation location of said actuator restricted by said restriction member, and corrects or learns the actuation location of said actuator corresponding to said parking position based on said detected actuation location.

10. The control method for a vehicle according to claim 7, further comprising the step of detecting the actuation location of said actuator by an encoder.

11. The control method for a vehicle according to claim 7, wherein the lock release signal generated by manipulation of said manipulation member by said driver is received via wire communication or wireless communication.

12. The control method for a vehicle according to claim 7, wherein
said manipulation member is a member to be touched by said driver from an outside of said vehicle when said driver releases a lock of a door lock mechanism of said vehicle, and
the step of detecting the state of said manipulation member detects that said driver has touched said member.

13. A control device for a vehicle, said vehicle including a plurality of electric apparatuses mounted in said vehicle, a shift switching mechanism setting a shift position corresponding to a traveling state of said vehicle to one of a plurality of shift positions by driving of an actuator in response to a switching signal, a power supply supplying electric power to said plurality of electric apparatuses, and a power supply relay collectively setting the electric power from said power supply to said plurality of electric apparatuses to one of a supply state and a cut-off state in response to manipulation by a driver, wherein the supply state is a state when the vehicle can start moving, said plurality of shift positions including at least a parking position, the control device comprising:

a smart electronic control unit (smart-ECU) configured with executable program logic, to detect a state of a manipulation member to be manipulated by said driver before said supply state is set by said power supply relay; and a shift by wire electronic control unit (SBW-ECU) configured with executable program logic, to control said actuator to correct or learn an actuation location of said actuator corresponding to said parking position, when (i) a state where said manipulation member has been manipulated by said driver before said supply state is set by said power supply relay, (ii) the shift position in said shift switching mechanism is said parking position is detected, and (iii) a door lock mechanism releases a lock by manipulation of said manipulation member, wherein said door lock mechanism releases said lock based on a lock release signal generated by manipulation of said manipulation member.

* * * * *